United States Patent [19]

Scholz et al.

[11] 4,425,963
[45] Jan. 17, 1984

[54] HEAT INSULATION FOR DOME-SHAPED BOTTOM AND/OR COVER REGION OF A PRESSURE VESSEL

[75] Inventors: Manfred Scholz, Erlangen; Wolfgang-Peter Fricker, Freinsheim; Bernd Gollasch, Nuremberg, all of Fed. Rep. of Germany

[73] Assignees: Kraftwerk Union Aktiengesellschaft, Mülheim; Grünzweig & Hartmann Montage GmbH, Ludwigshafen, both of Fed. Rep. of Germany

[21] Appl. No.: 241,944

[22] Filed: Mar. 9, 1981

[30] Foreign Application Priority Data

Mar. 10, 1980 [DE] Fed. Rep. of Germany ....... 3009134

[51] Int. Cl.³ .......................................... G21C 13/00
[52] U.S. Cl. ............................ 165/104.32; 376/307; 376/289; 376/203; 376/260
[58] Field of Search .............. 376/307, 203, 204, 205, 376/289, 260, 262, 263, 249; 165/135, 104.32, 11 A, 11 R; 52/249, 224, 745; 122/32, DIG. 14; 220/435, 437

[56] References Cited

U.S. PATENT DOCUMENTS

| 2,925,934 | 2/1960 | Hampton et al. | 220/437 |
|---|---|---|---|
| 3,442,760 | 5/1969 | Rigg | 122/32 X |
| 3,640,032 | 2/1972 | Jubb | 52/224 X |
| 3,713,459 | 1/1973 | McIver et al. | 52/224 X |
| 3,713,560 | 1/1973 | Slysh et al. | 220/437 |
| 3,744,660 | 7/1973 | Gaines et al. | 220/437 |
| 3,836,429 | 9/1974 | Frisch et al. | 376/263 X |
| 3,907,151 | 9/1975 | Gilden | 376/289 X |
| 4,135,552 | 1/1979 | Mendolia | 376/307 X |
| 4,156,492 | 5/1979 | Cavanna et al. | 220/435 |

FOREIGN PATENT DOCUMENTS

2544054 4/1977 Fed. Rep. of Germany ...... 376/249

*Primary Examiner*—Richard E. Schafer
*Assistant Examiner*—Daniel Wasil
*Attorney, Agent, or Firm*—Herbert L. Lerner; Laurence A. Greenberg

[57] ABSTRACT

Heat insulation for domeshaped bottom and/or cover regions of a pressure vessel, the heat insulation being penetrated by a multiplicity of pressure vessel unions extending parallel to the axis of the pressure vessel, including an integral dome formed of heat insulation having a passage formed therein for each of the pressure vessel unions, guide elements extending parallel to the axis of the pressure vessel for centering the heat-insulation dome with respect to the pressure vessel and for axially movably mounting the heat-insulation dome so that it can be lowered from a largely convection-proof operating position thereof to a storage position thereof onto an assembly platform, whereby the union passages of the pressure vessel are exposed for in-service testing, and can be raised back to the operating position thereof.

6 Claims, 9 Drawing Figures

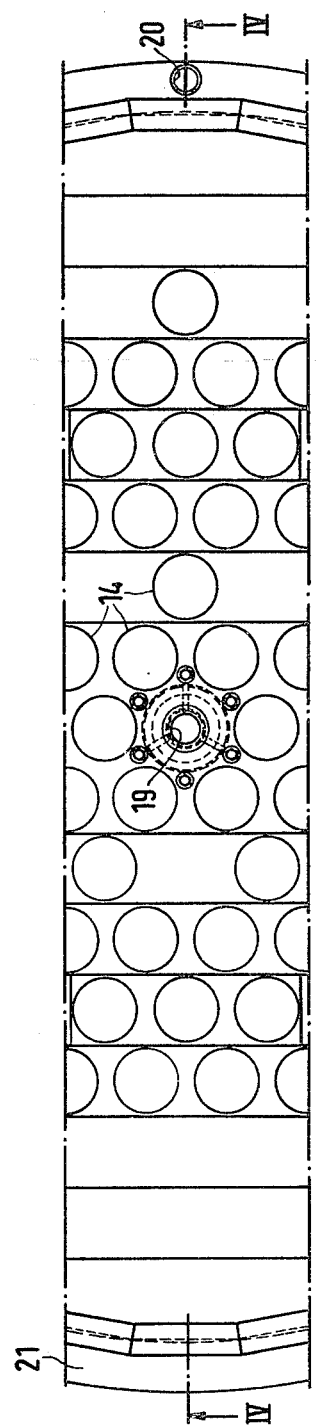
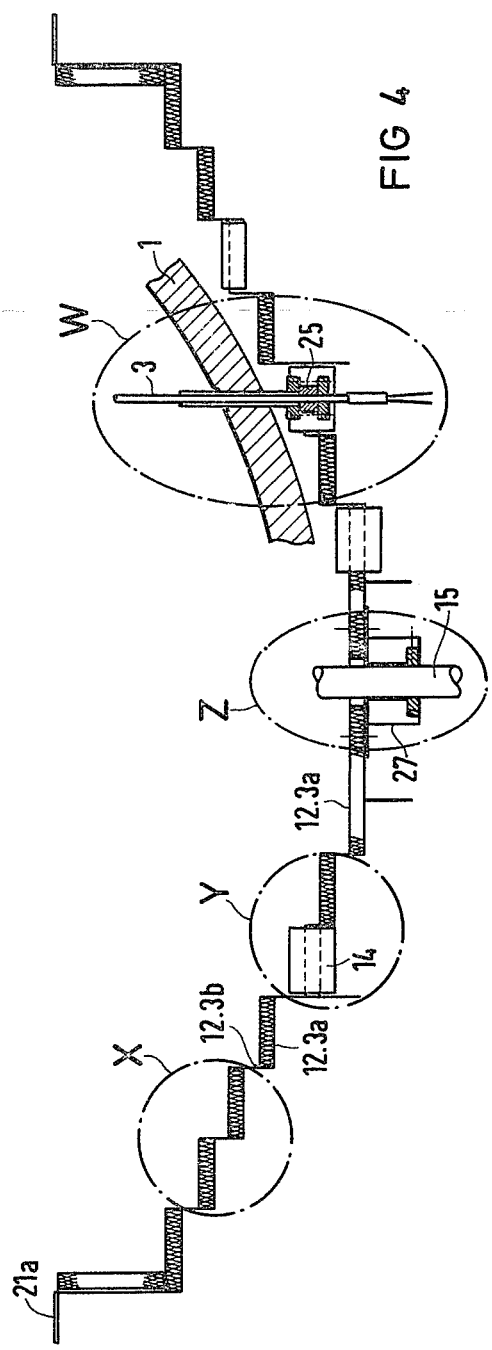

HEAT INSULATION FOR DOME-SHAPED BOTTOM AND/OR COVER REGION OF A PRESSURE VESSEL

The invention relates to heat insulation for dome-shaped and/or cover regions of a pressure vessel and, more particularly, to such heat insulation penetrated by a multiplicity of pressure vessel unions extending parallel to the axis of the pressure vessel, preferably for a nuclear power plant pressurizer equipped with heating elements which are rod-shaped and are provided with connecting leads projecting pressure-tightly and electrically insulated through appertaining bottom unions of the pressurizer into the interior of the pressurizer.

The safety regulations and provisions for nuclear power plants are subject to continuous re-development. Thus, a change has been made in recent years to subject the union passages in cover calottes of pressure vessels to an in-service test with ultrasound. The special problem which arises in this connection is to construct the heat insulation in domed covers or heads of pressure vessels, which are equipped with sub or union feed-throughs, in such a way that they are easy to assemble and disassemble. For in-service tests, the nuclear power plant must be shut down and any additional shutdown time which is caused by extensive disassembly and reassembly work on the heat insulation results in additional cost.

It is accordingly an object of the invention to provide heat insulation of the foregoing type in such a way and with such means that it can be disassembled and re-assembled conveniently and rapidly. This is of importance not only for the so-called zero power measurement (before the nuclear reactor becomes critical), but especially for in-service tests during shut-down of a nuclear power plant which has already been in operation, because then, radiation exists at the pressure vessel to be inspected, which permits working on these components only in protective clothing, and only for a relatively short time. Among the primary loop components which must lately be subjected to an in-service test in the vicinity of the stubs or unions is the pressurizer which has a bottom equipped with heating rods and corresponding heating rod feedthroughs, which must be in-service tested at predetermined intervals. Ultrasonic testing of the lands between the holes of the heater rod feedthroughs is prescribed. It is therefore a more specific object of the invention to provide a heat insulation for a pressurizer bottom which can be disassembled and re-assembled conveniently and rapidly and which permits the performance of in-service testing with only little preparation time (exposing the union passages to be tested by removing the heat insulation material).

With the foregoing and other objects in view, there is provided, in accordance with the invention, a heat insulation for domeshaped bottom and/or cover regions of a pressure vessel, the heat insulation being penetrated by a multiplicity of pressure vessel unions extending parallel to the axis of the pressure vessel, comprising an integral dome formed of heat insulation having a passage formed therein for each of the pressure vessel unions, guide elements extending parallel to the axis of the pressure vessel for centering the heat-insulation dome with respect to the pressure vessel and for axially movably mounting the heat-insulation dome so that it can be lowered from a largely convection-proof operating position thereof to a storage position thereof onto an assembly platform, whereby the union passages of the pressure vessel are exposed for in-service testing, and can be raised back to the operating position thereof.

In accordance with another feature of the invention, there are provided sheetmetal jackets defining the passages formed in the heat insulation dome, and respective sealing sleeves floatingly mounted with the outer circumference thereof disposed at the inner circumference of the sheetmetal jackets, respectively, the sealing sleeves effecting largely convection-proof sealing of the heat-insulating dome, in the operating position thereof, from heating rod flanges operatively associated with the respective pressure vessel unions and with heating rods, respectively, extending therethrough.

In accordance with a further feature of the invention, the pressure vessel is surrounded by heat insulation above the domeshaped bottom thereof, the heat insulation dome having a sheetmetal enclosure at the outer diameter thereof engageable, in the operating position of the heat insulation dome, with the heat insulation surrounding the pressure vessel.

In accordance with an additional feature of the invention, the assembly platform disposed below the pressure vessel is formed with a central opening through which there extend power supply cables for heater rods extending through the pressure vessel unions into the pressure vessel.

In accordance with an added feature of the invention, there is provided a drain line extending substantially in axial direction of the pressure vessel and gripped by a bushing disposed at and coaxial to the heat-insulation dome, the drain line serving as a guide element when lowering and raising the heat-insulation dome, and at least one vertical guide bushing located on the heat-insulation dome in vicinity of the outer circumference thereof and guidable parallel to the axis of the pressure vessel along a respective guide rod extending downwardly from the pressure vessel, the guide bushing and the guide rod fixing the heat-insulation dome against turning in circumferential direction thereof.

In accordance with yet another feature of the invention, the heat insulation of the heat-insulation dome has a heat conductivity lower than that of stagnant air.

In accordance with a concomitant feature of the invention, the pressure vessel is a nuclear power plant pressurizer equipped with rod-shaped heating elements having connection leads projecting pressure-tightly and electrically insulated through respective unions at the dome-shaped bottom of the pressurizer into the interior of the pressurizer.

The advantages attainable with the invention are primarily that the preparation of the in-service test can be performed rapidly and conveniently; it is only necessary to detach fast-acting closures at the heat insulation hood or dome and to lower the latter to the storage position thereof on the assembly stage or platform by means of draw gears or by hand. The pressure vessel bottom or the pressurizer bottom then becomes accessible for the in-service test. In the case of the pressurizer in-service test, disassembly of the power cables of the pressurizer heater rods is unnecessary because of the shape or construction of the heat insulation hood or dome.

Other features which are considered as characteristic for the invention are set forth in the appended claims.

Although the invention is illustrated and described herein as embodied in a heat insulation for dome-shaped bottom and/or cover regions of a pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is an enlarged fragmentary view of FIG. 2;

FIG. 4 is a cross-sectional view of FIG. 3 taken along the line IV—IV in direction of the arrows;

Figure 1:
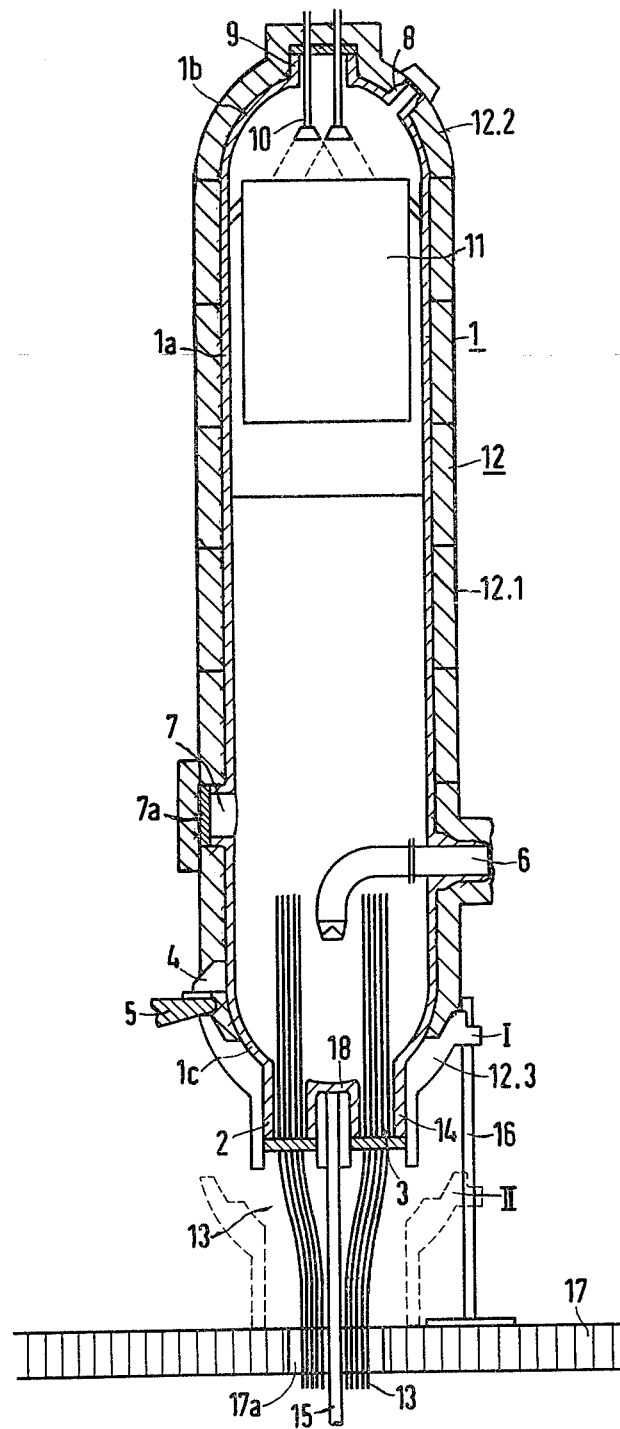
FIG. 1 is a diagrammatic vertical sectional view, in its entirety, of a pressurizer with the heat insulation material according to the invention in the lower spherical or calotte-shaped region thereof.

Referring now to the drawing and first, particularly, to FIG. 1 thereof, there is shown a pressurizer 1 which is an upright pressure vessel of substantially hollow-cylindrical form. It is formed of a cylindrical shell 1a and an upper hemispherical lead 1b and a lower hemispherical bottom 1c. The bottom 1c has stubs or unions 2 for passing pressurizer heating rods 3 through in a gas and pressure-tight manner. Somewhat above the bottom 1c, a support claw 4 for an otherwise non-illustrated support 5 is provided, and further provided are a stub or union 6 welded into the wall of the pressurizer 1 for a pressurizer surge line and a manhole 7 with a manhole cover 7a. In the hemispherical head 1b there are located stubs or unions 8 for pressure relief valves and safety valves and, in the middle of the head 1b a stub or union 9 for a spray system 10.

A protective skirt 11 is fastened within the pressurizer 1 and protects the upper part of the pressure vessel 1 from thermal shocks due to cold spray water.

The pressurizer 1 is enclosed by heat insulation, identified as a whole by reference numeral 12, which is formed of individual cylinder sections 12.1 as well as of an upper hood or dome 12.2 and a lower hood or dome 12.3. The cylinder sections 12.1 as well as the upper dome 12.2 may again be subdivided into individual segments. Each of the segments is formed advantageously of insulating material of the mineral fiber or mineral wool type, which is enclosed by metal foil, especially of austenitic metal sheet. The individual segments are arranged in those regions which should be capable of being in-service tested so that they can be disassembled and re-assembled readily and can, for this purpose, be fastened, especially by means of non-illustrated toggle-type fasteners at the circumference of the pressurizer 1.

The invention of the instant application is concerned with the heat insulation for the domed bottom 1c of the pressurizer 1 through which a multiplicity of pressure vessel stubs or unions 2 extend in this region parallel to the axis of the pressure vessel. The unions 2 and the heater rods 3 are shown only in simplified form in FIG. 1; in reality, not merely two but a multiplicity of unions 2 with corresponding individual heater rods 3 are distributed over the area of the bottom 1c, as will be discussed hereinafter in greater detail. The rod-shaped heating elements, which are provided with schematically indicated electrical leads 13 and extend into the interior of the pressurizer 1 are passed through the bottom unions 2 of the pressurizer 1 in a pressure-tight and electrically insulated manner, as mentioned hereinbefore. According to the invention, the heat insulation 12.3 is formed as the integral heat insulating dome which has a respective passage 14' for each pressurizer union 2. The heat insulation dome 12.3 is centered on guide elements 15, 16, which are disposed parallel to the axis of the pressurizer, and is axially movably mounted in a manner that it can be lowered from a largely convection-proof operating position 1 thereof (shown in solid lines) into a storage position II thereof, shown in broken lines onto an assembly platform 17, due to which the union passages 18 of the pressurizer are exposed for in-service testing. After the in-service test has been completed, the heat insulation hood or dome 12.3 can be raised again from the storage position II therefore into the operating position I thereof. For lowering and raising the heat insulation hood 12.3, non-illustrated grippers or blocks and tackle can be used, which can be operated relatively easily manually or by means of small hoisting motors. The assembly platform 17 is a metal grid structure which has a central opening 17a through which the power cables or leads 13 for the heating rods 3 and the central drain line 15 of the pressurizer 1 are passed through downwardly. The central drain line 15 and at least one further vertical guide rod 16 serve for guiding the heat insulation dome 12.3 during the lowering and raising thereof, the heat insulation dome 12.3 being slidable in axial direction along the drain line 15 and the guide rod 16 by means of guide sleeves otherwise non-illustrated in FIG. 1. The cables 13 need not be removed when the heat insulation hood or dome 12.3 is lowered; the hood or dome 12.3, as will be explained further hereinafter, is constructed in such a way that sealing bushings thereof which surround the heater-rod feedthrough stubs or unions, slide over the cables.

Figure 2:
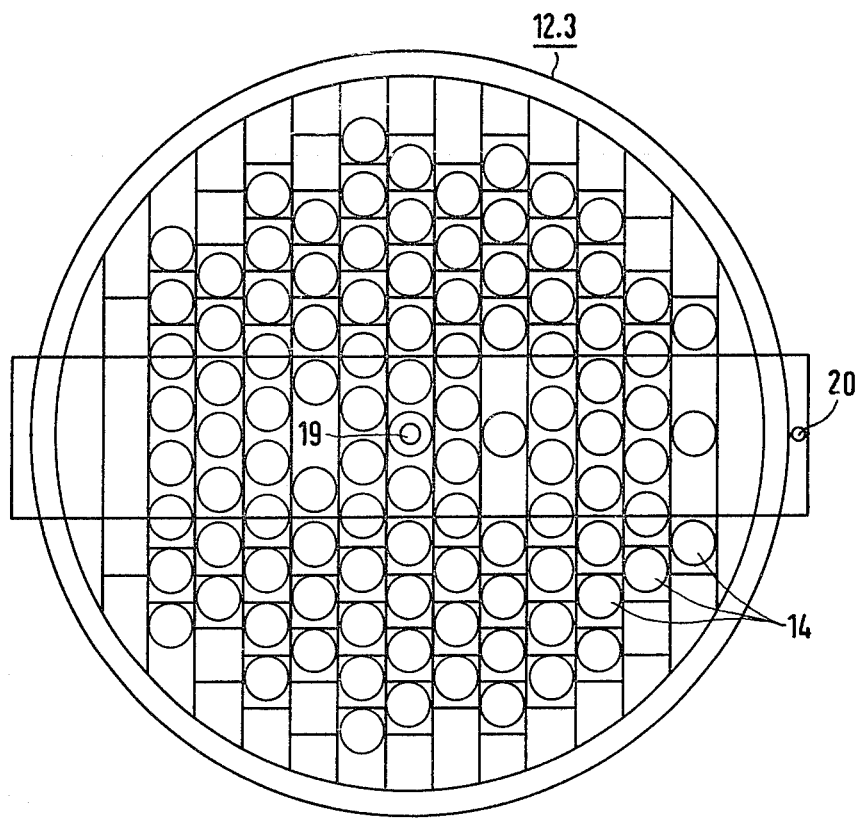
FIG. 2 is an enlarged fragmentary bottom plan view of FIG. 1 showing the bottom calotte.

As mentioned hereinbefore, FIG. 2 is a bottom plan view of the bottom calotte or dome of the pressurizer 1 with a multiplicity of passages 14' of the heat insulation hood associated with the pressurizer stubs or unions 2, a centrally arranged bushing 19 for the central drain line 15 (FIG. 1), and a vertical guide bushing 20 for the downwardly extending guide rod 16 (FIG. 1).

The enlarged view of FIG. 3 shows that the heat insulation hood or dome 12.3 is provided at the outer diameter thereof with a sheetmetal enclosure 21 which can be brought, in the operating position I (FIG. 1), into engagement with sealing surfaces 21a (note FIG. 4) in largely convection-tight contact with the transition and/or cylindrical region of the heat insulation 12, 12.1 of the pressurizer 1 (note FIG. 1). The sheet metal enclosure 21 further increases the strength of the hood or dome 12.3 and the torsion resistance thereof.

Figure 5:
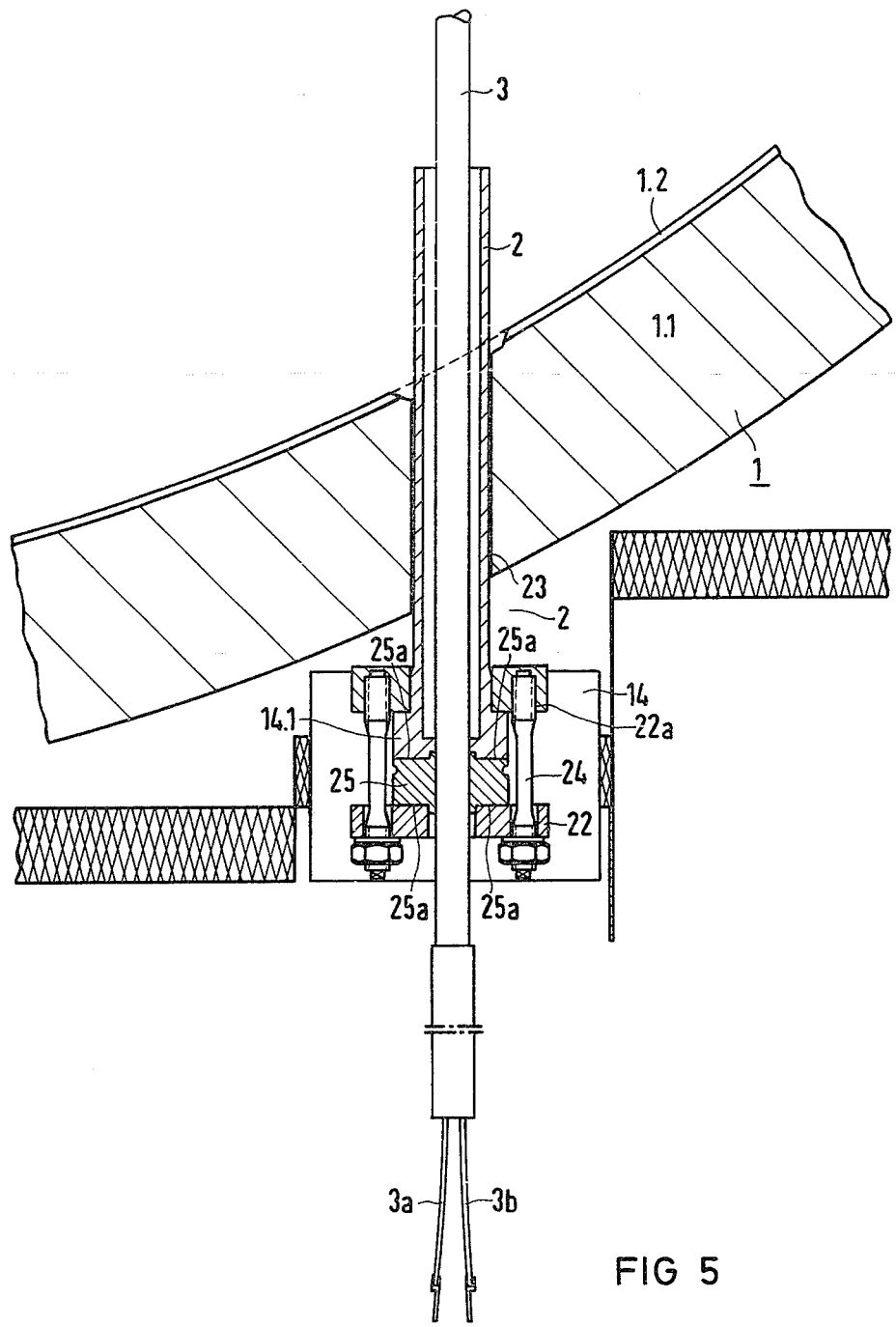
FIG. 5 is an enlarged fragmentary view of FIG. 4 showing the detail W.

FIG. 4 in conjunction with FIG. 5 shows in detail that the hood or dome 12.3 has a respective passage 14' for each pressurizer stub or union. The largely convection-proof sealing of the hood or dome 12.3 from the heater rod flanges 22 associated with the stubs or unions 2 and the heater rods 3 is accomplished by means of sealing bushings 14. Hereinafter, only the sealing bushings 14 will be mentioned even though it must be said that, in principle, a different feedthrough element is also conceivable for the convection-proof passages.

In FIG. 5, the wall 1.1 of the pressurizer 1 and the austenitic inner plating 1.2 of this wall 1.1 are shown. Feedthrough stubs or unions 2 are inserted and welded in through-bores 23 of this wall 1.1, the axes of which are parallel to each other. At their lower end, the stubs or unions 2 are provided with a reinforced coupling flange 14.1 and further with a collar 22a which engages behind this flange 14.1 and which is slid onto the neck of the stub or union 2, and which is provided with a ring of tapped holes for screwing-in expansion bolts 24. Through the latter, the flange cover 22, which has a central hole like the sealing disc 25, is drawn against the coupling flange 14.1 and thereby presses the sealing disc 25 with the sealing surface 25a thereof against corresponding counter-sealing surfaces at the coupling flange 14.1 and at the inside of the cover 22. The sealing disc 25 is a steel disc which is tightly welded to the outer circumference of the heating rod 3. Electrical leads 3a, 3b, are brought into the heater rod 3 to non-illustrated corresponding heating coils.

The sealing bushing 14 extends around the ring collar 22a as well as the cover 22 at the outer circumference thereof. The outer diameter of the ring collar 22a is somewhat larger than that of the cover 22, so that the sealing sleeve 14 can be slid relatively easily with play over the outer circumference of the cover 22 when the hood or dome 12.3 is slipped on, and then forms a seal fit i.e. a convection seal, at the outer circumference of the ring collar 22a.

Figure 6:
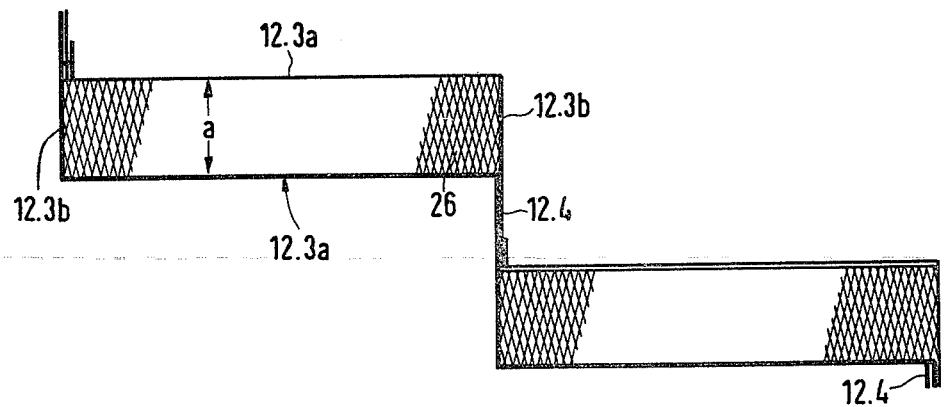
FIG. 6 is an enlarged fragmentary view of FIG. 4 showing the detail X.

The insulating hood or dome 12.3 is formed preferably of austenitic steel sheet, which is corrosion-resistant; it is welded together from corresponding disc-shaped parts 12.3a and of cylindrical parts 12.3b. The disc parts 12.3a are disposed at a mutual spacing a (see FIG. 6) and form, with the circumferential walls 12.3b thereof, ring boxes wherein the insulating material 26 is disposed and enclosed. A mineral fiber product is especially suitable as insulating material 26. It has been found to be particularly advantageous if, for this purpose, a special insulating material with a lower heat conductivity, which is commercially available under the trademark "Minileit", is used than that of the stagnant air. This is a relatively highly densified insulating material with a small particle size having silicon dioxide $SiO_2$ as a base, in which cavities enclosed between the particles are smaller than the free path of the gas molecules. The advantage of such an insulating material is that the insulating thickness can be reduced to about one-third to one-fifth that of a normal mineral fiber insulating material, whereby a relatively light-weight construction is obtained. The disc and cylinder parts 12.3a, 12.3b are provided with corresponding overhangs 12.4 which overlap one another (note FIGS. 6 and 7), the overlaps being spot-welded.

Figure 7:
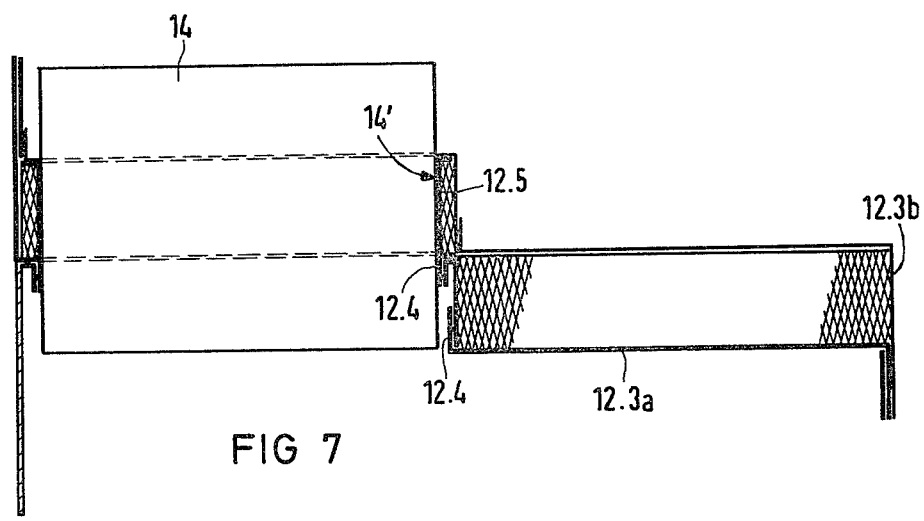
FIG. 7 is an enlarged fragmentary view of FIG. 4 showing the detail Y.

As shown in FIG. 7, the sealing sleeves 14 are supported floating with the outer circumference thereof, at the inner circumference of sheetmetal jackets 12.5 of the head or dome 12.3 which define passage openings 14'. These sheet metal jackets 12.5 likewise have the aforementioned overhangs 12.4 and by means of them are connected to the adjoining disc and cylinder parts of the hood or dome 12.3 by means of spot welding. The floating support results from the elasticity of the sheet metal jackets 12.5 and the flanges 12.4 thereof. The sealing sleeve 14 can be fastened by means of several welded spots to the sheetmetal jackets 12.5. The floating support is particularly advantageous for the reason that small tolerances can be equalized thereby when the hood or dome 12.3 is set in place i.e. the cover 22, the outer circumference of which is somewhat smaller, fits in any case into the inner circumference of the sealing sleeve 14 which is centered thereby, and then finds its seat at the ring collar 22a upon being slid-on further.

Figure 8:
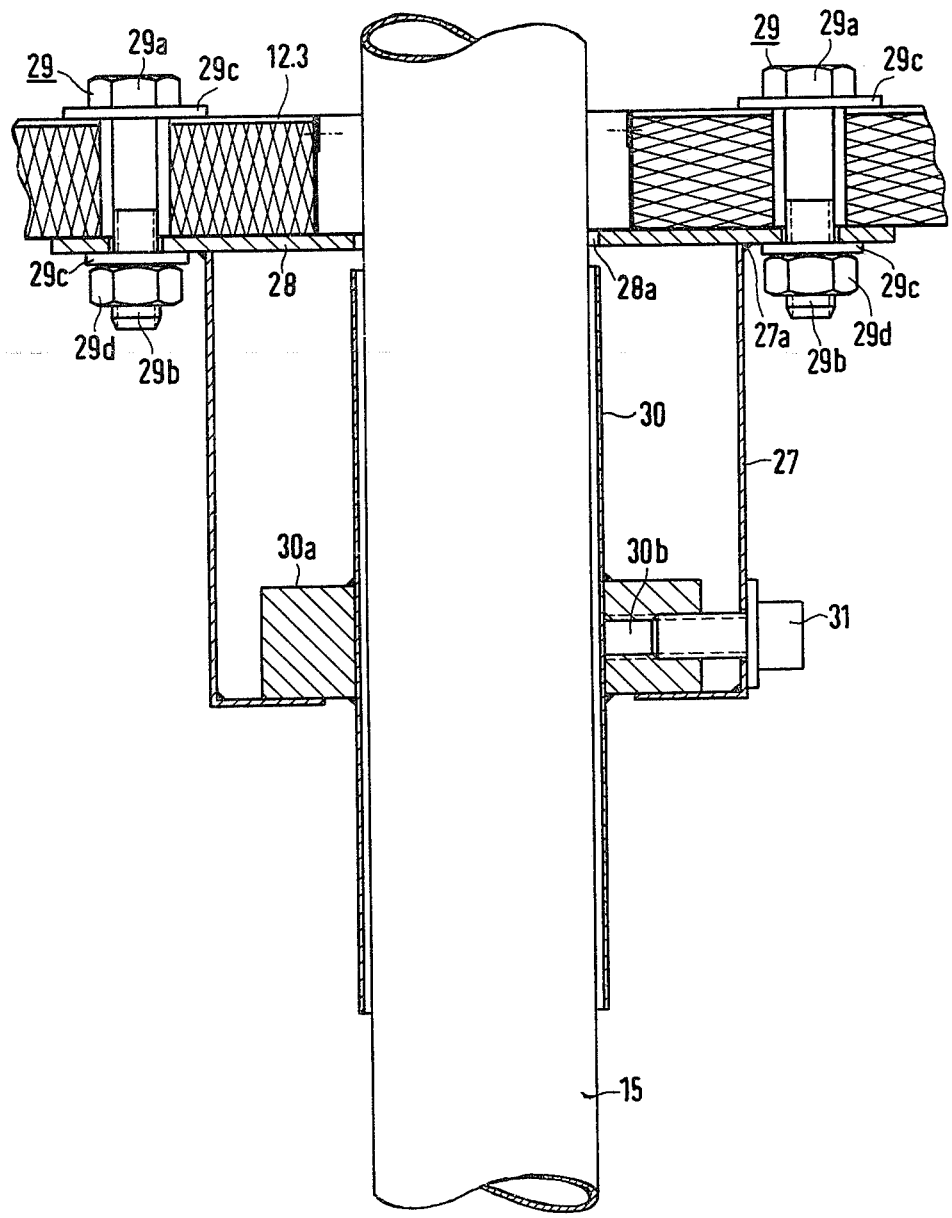
FIG. 8 is an enlarged fragmentary view of FIG. 4 showing the detail Z.
Figure 9:
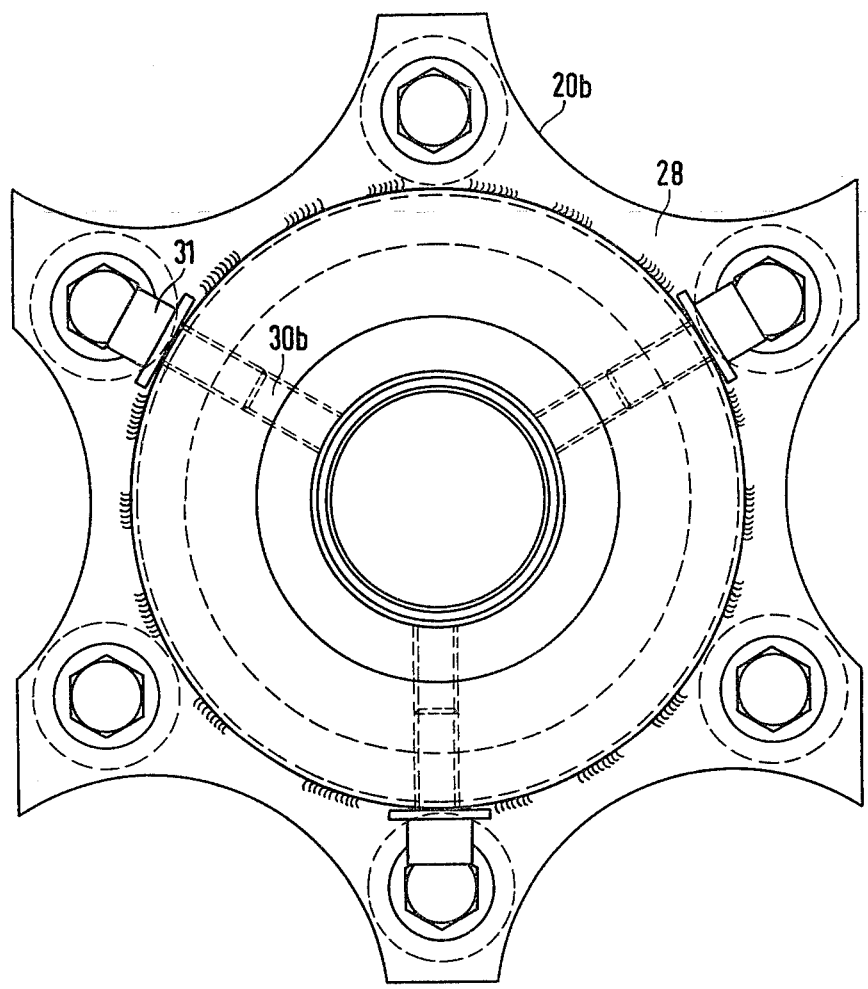
FIG. 9 is a top plan view of FIG. 8.

FIG. 4 in conjunction with FIGS. 8 and 9 shows more clearly that the drain line 15, which extends approximately in the longitudinal axis of the pressurizer 1, is surrounded by a bushing 27 which is disposed centered at the hood or dome 12.3. For fastening the bushing 27, the hood or dome 12.3 is provided with an anchor plate 28 which has a passage opening 28a for the drain line 15. The bushing 27 is welded to the anchor plate 28 by means of a circular welding seam 28a (see also FIGS. 8 and 9). The anchor plate 28, in turn, is connected to the hood or dome 12.3 i.e. to the central sheetmetal discs 12.3a thereof, by means of screw bolts 29 going through corresponding passage holes; the screw bolts again have a head 29a, a shank 29b, washers 29c and a nut proper 29d. For centrally aligning the hood or dome 12.3 with respect to the drain line 15, the bushing 27 has an inner sleeve part 30 which is provided with a ring collar 30a at the outer circumference thereof. Into the latter there are incised tapped holes 30b distributed over the circumference thereof and into the tapped holes 30b are screwed adjusting screws 31 from the outer circumference of the bushing 27. As is shown in FIG. 9, three tapped holes 30b, uniformly distributed over the circumference, and corresponding adjusting screws 31 are provided so that the exact centered relative position of the hood or dome 12.3 to the drain line 15 which, of course, serves as a central guide element, can be established in a manner similar to that for a Christmas tree stand. The anchor plate 28 is provided at the outer circumference thereof with teeth 28b so that the space for the sleeves 14 remains free, (see FIG. 3).

It is understood that the heat insulation hood or dome according to the invention is suitable not only for pressurizers and not only for pressure vessels of which the array of stubs or unions is located on the region of the lower bottom dome as viewed in FIG. 1. The invention can be used to advantage also for other pressure vessels, for example for reactor pressure vessels, wherein the union passages which are to be tested in-service, are located in the region of the upper head dome. This is the case in nuclear reactor pressure vessels for pressurized-water reactors whereas in boiling-water reactors the control rod drives are generally passed through the bottom dome i.e. similarly to the illustrated pressurizer.

We claim:

1. Heat insulation device for domeshaped bottom region of a pressure vessel, the heat insulation device being penetrated by a multiplicity of pressure vessel unions extending parallel to the axis of the pressure vessel heating rod flanges being secured to the respective pressure vessel unions and having respective heating rods extending therethrough and through the respective pressure vessel unions into the pressure vessel, comprising an integral dome disposed externally to the pressure vessel and formed of heat insulation having a passage formed therein for each of the pressure vessel unions, sheetmetal jackets defining the passages formed in the heat insulation dome, and respective sealing sleeves floatingly mounted with the outer circumference thereof disposed at the inner circumference of said sheetmetal jackets, respectively, said sealing sleeves effecting largely convection-proof sealing of said heat-insulation dome, in an operating position thereof, from the heating rod flanges, guide elements extending downwardly away from the pressure vessel and parallel to the axis of the pressure vessel for centering said heat-insulation dome with respect to the pressure vessel and for axially movably mounting said heat-insulation dome so that it can be lowered from said largely convection-proof operating position thereof to a storage position thereof onto an assembly platform located below and spaced from the pressure vessel, whereby the union passages of the pressure vessel are exposed for in-service testing, and so that said heat-insulation dome can be raised back to said operating position thereof.

2. Heat insulation device according to claim 1 wherein the pressure vessel is surrounded by heat insulation above the domeshaped bottom thereof, said heat insulation dome having a sheetmetal enclosure at the outer diameter thereof engageable, in said operating position of said heat insulation dome, with the heat insulation surrounding the pressure vessel.

3. A pressure vessel having a dome-shaped bottom covered externally by the heat insulation dome according to claim 1 wherein said assembly platform disposed below the pressure vessel is formed with a central opening through which there extend power supply cables for heater rods extending through the pressure vessel unions and the respective passages formed in the heat insulation dome and into the pressure vessel.

4. Heat insulation device according to claim 1 including a drain line extending substantially in axial direction of the pressure vessel and gripped by a bushing disposed at and coaxial to said heat-insulation dome, said drain line serving as a guide element when lowering and raising said heat-insulation dome, and at least one vertical guide bushing located on said heat-insulation dome in vicinity of the outer circumference thereof and guidable parallel to the axis of the pressure vessel along a respective guide rod extending downwardly from the pressure vessel, said guide bushing and said guide rod fixing said heat-insulation dome against turning in circumferential direction thereof.

5. Heat insulation device according to claim 1 wherein the heat insulation of said heat-insulation dome has a heat conductivity lower than that of stagnant air.

6. A pressure vessel having a dome-shaped bottom covered externally by the heat insulating dome according to claim 1 wherein the pressure vessel is a nuclear power plant pressurizer equipped with rod-shaped heating elements having connecting leads projecting pressure-tightly and electrically insulated, via said union passages, respectively, formed in the heat insulation dome, through respective unions at the dome-shaped bottom of the pressurizer into the interior of the pressurizer.

* * * * *